United States Patent
Kers et al.

(10) Patent No.: US 11,546,244 B1
(45) Date of Patent: Jan. 3, 2023

(54) NAMESPACE-AWARE TEST AGENTS FOR NETWORK PERFORMANCE MEASUREMENT

(71) Applicant: Juniper Networks, Inc., Sunnyvale, CA (US)

(72) Inventors: Fredrik Anders Kers, Lulea (SE); John Clementi Hedges, Longtown (GB)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/450,430

(22) Filed: Oct. 8, 2021

(51) Int. Cl.
*H04L 43/50* (2022.01)
*H04L 43/0817* (2022.01)
*H04L 43/065* (2022.01)

(52) U.S. Cl.
CPC ............ *H04L 43/50* (2013.01); *H04L 43/065* (2013.01); *H04L 43/0817* (2013.01)

(58) Field of Classification Search
CPC .......................... H04L 43/50; H04L 43/0817
See application file for complete search history.

(56) References Cited

U.S. PATENT DOCUMENTS

| | | | | |
|---|---|---|---|---|
| 2013/0133061 | A1* | 5/2013 | Fainkichen | G06F 9/455 726/15 |
| 2018/0013660 | A1* | 1/2018 | Kutergin | H04L 61/1552 |
| 2018/0357068 | A1* | 12/2018 | Ambichl | G06F 9/545 |
| 2019/0068641 | A1* | 2/2019 | Araujo | G06F 21/566 |
| 2020/0067801 | A1* | 2/2020 | McCormick | H04L 43/062 |
| 2021/0234785 | A1* | 7/2021 | Green | H04L 43/12 |
| 2021/0392061 | A1* | 12/2021 | Degioanni | G06F 11/302 |

OTHER PUBLICATIONS

"A Complete Introduction to Monitoring Kubernetes with New Relic", New Relic [online]. Retrieved from the Internet: <https://newrelic.com/platform/kubernetes/monitoring-guide> First Accessed on Jun. 2, 2021, 37 pp.

"Collecting Metrics for TCP Services", Istio [online]. Retrieved from the Internet: <https://istio.io/latest/docs/tasks/observability/metrics/tcp-metrics/> First Accessed on Jun. 2, 2021, 6 pp.

(Continued)

*Primary Examiner* — Philip C Lee
(74) *Attorney, Agent, or Firm* — Shumaker & Sieffert, P.A.

(57) ABSTRACT

In general, the disclosure describes a method that includes partitioning resources of a computing device into a first namespace comprising a first physical network interface and a second namespace comprising a second physical network interface; creating, by a test agent executing as a process in the second namespace, a test agent child in the second namespace; migrating the test agent to execute as a process in the first namespace; communicating, by the test agent child via the second physical network interface, test packets; obtaining, by the test agent, network performance measurement data that is based at least on the test packets; and outputting, by the test agent while executing as a process in the first namespace, an indication of the network performance measurement data.

20 Claims, 5 Drawing Sheets

(56) References Cited

OTHER PUBLICATIONS

"Kubernetes outgoing connections", stack overflow [online]. Retrieved from the Internet: <https://stackoverflow.com/questions/53400039/kubernetes-outgoing-connections> Updated Jan. 24, 2019, 4 pp.

Armstrong, "Enabling More Effective Kubernetes Troubleshooting on Rancher", Rancher [online]. Retrieved from the Internet: <https://rancher.com/blog/2020/enabling-kubernetes-troubleshooting> Updated Jan. 26, 2021, 6 pp.

"Monitor Kubernetes: Observe the health and performance of your Kubernetes deployments", elastic [online]. Retrieved from the Internet: <https://www.elastic.co/guide/en/observability/master/monitor-kubernetes.html> First Accessed on Jun. 3, 2021, 20 pp.

Withers, "Monitoring Application Performance in Kubernetes: How New Relic Sets You Up for Success", New Relic [online]. Retrieved from the Internet: <https://newrelic.com/blog/how-to-relic/monitoring-application-performance-in-kubernetes> May 26, 2021, 14 pp.

Murthy et al., "Cisco Secure Agile Exchange with Netrounds Automated Active Assurance", Cisco [online]. Retrieved from the Internet: <https://community.cisco.eom/kxiwq67737/attachments/kxiwq67737/5672j-docs-dev-nso/294/1/NSO_SAE_Dev_Days_Netrounds_June_19_JK.pdf> Jun. 2019, 35 pp.

Wilson, "How to Setup Prometheus Monitoring on Kubernetes Cluster", devops [online]. Retrieved from the Internet: <https://devopscube.com/setup-prometheus-monitoring-on-kubernetes/> Apr. 7, 2021, 20 pp.

Chockalingam, "What Is eBPF and Why Does It Matter for Observability?", New Relic [online]. Retrieved from the Internet: <https://newrelic.com/blog/best-practices/what-is-ebpf> Apr. 23, 2021, 11 pp.

U.S. Appl. No. 63/114,444, filed Nov. 16, 2020.

\* cited by examiner

NAMESPACE-AWARE TEST AGENTS FOR NETWORK PERFORMANCE MEASUREMENT

TECHNICAL FIELD

The disclosure relates to computer networks, and more specifically, to measuring network performance.

BACKGROUND

A computer network is a collection of interconnected computing devices that can exchange data and share resources. In some examples, the computing devices may provide services to measure network performance of a computer network. For example, the computing devices may exchange data to compute key performance indicators (KPIs), such as latency, inter frame gap (Inter Frame Delay Variation), jitter, packet loss, throughput, and the like.

Computing devices of a network can be configured as measurement points (e.g., with test agents) to measure network performance. For example, a test agent of a sender computing device (referred to herein as "sender device") may send a test packet to a test agent of a receiving device (referred to herein as "receiver device"), which in turn may use the test packet to compute one or more KPIs. As one example, the sender device may send a test packet including a timestamp indicating the time at which the test packet is sent (referred to herein as "sending timestamp"). When the receiver device receives the test packet, the receiver device generates a timestamp indicating the time at which the test packet is received (referred to herein as "receiving timestamp"). The receiver device may use the timestamps to compute one or more KPIs, such as latency. A controller may obtain the measured KPIs from the receiver device, and may output for display, e.g., via a graphical user interface, the measurements to a user or network administrator.

A computing device may include a kernel that can partition kernel and hardware resources among processes, such that one set of processes has access to some of the resources, while another set of processes has access to other resources. Each such partition of resources and the processes having access to that partition is known as a namespace. Processes can create additional namespaces and move between namespaces. Example kernel and hardware resources that may be allocated among namespaces include file names, interprocess communication, process identifiers (IDs), and user IDs. There are many kinds of namespaces, including the network namespace. A network namespace created on a device has a private set of network (e.g., Internet Protocol-IP) addresses, one or more routing tables, a network stack, and other network resources. Each network interface of the device is allocated to one namespace, although any given namespace may have multiple network interfaces (physical and/or virtual).

SUMMARY

In general, the disclosure describes namespace-aware test agents within computing devices for network performance measurement. For example, a test agent is deployed to a computing device as a process that is capable of moving between namespaces and creating a child process (hereinafter, "test agent child" or "test agent child process") within each namespace to perform network performance measurement for that namespace and its associated resources. The test agent child, created in a namespace in this way, may send and receive test packets via a network interface allocated to that namespace and accessible to processes within that namespace, and the test agent child may collect network performance measurement data based on the test packets. Because the test packets are sent and received via the network interface allocated to that namespace, the network performance measurement data based on the test packets is specific to that namespace. A test agent child, as a process, may have more limited functionality than the test agent process. For instance, the test agent may be capable of moving between namespaces and creating test agent children, may measure network performance by sending and receiving test packets via a network interface, may listen for and respond to network state changes in different namespaces, may collect network performance measurement data from the test agent children in other namespaces, and may have a northbound interface for communicating network performance measurement data to a controller. The test agent child, by contrast, may only be capable of measuring network performance from the above list of capabilities.

The techniques described in this disclosure may have one or more technical advantages that may realize at least one practical application. For example, because a single test agent process, using comparatively light-weight test agent child processes, is needed to administer multiple namespaces and network interfaces, the techniques may allow for running only a single test agent process per host device, which may reduce host device resource utilization. As another example, the techniques may allow for isolating management and measurement traffic from each other in different namespaces: whereas the test agent may use a particular namespace (and network interface) for management traffic, the test agent children may exchange test packets (measurement traffic) from within their respective namespaces and via respective network interfaces therein. As another example, in contradistinction to other solutions in which a full test agent is deployed to each namespace, the test agent child processes do not need to have many of the above-listed capabilities, while a single test agent administers multiple test agent child processes. As a result, and again in contradistinction to other solutions, the controller may have only a single control interface per host device, i.e., with the test agent, rather than separate control interfaces for each namespace configured on the host device. The controller management interface may also present, to the user/operator, a unified measurement configuration interface for configuring network performance measurement on a host device.

In an example, a computing device includes a first physical network interface and a second physical network interface; and one or more processors operably coupled to a memory, wherein the one or more processors and memory are configured to: partition resources of the computing device into a first namespace comprising the first physical network interface and a second namespace comprising the second physical network interface; create, by a test agent executing as a process in the second namespace, a test agent child in the second namespace; migrate the test agent to execute as a process in the first namespace; communicate, by the test agent child via the second physical network interface, test packets; obtain, by the test agent, network performance measurement data that is based at least on the test packets; and output, by the test agent while executing as a process in the first namespace, an indication of the network performance measurement data.

In an example, a method includes partitioning resources of a computing device into a first namespace comprising a first physical network interface and a second namespace comprising a second physical network interface; creating, by a test agent executing as a process in the second namespace, a test agent child in the second namespace; migrating the test agent to execute as a process in the first namespace; communicating, by the test agent child via the second physical network interface, test packets; obtaining, by the test agent, network performance measurement data that is based at least on the test packets; and outputting, by the test agent while executing as a process in the first namespace, an indication of the network performance measurement data.

In an example, a non-transitory computer-readable medium includes instructions for causing processing circuitry to perform operations comprising: partitioning resources of a computing device into a first namespace comprising a first physical network interface and a second namespace comprising a second physical network interface; creating, by a test agent executing as a process in the second namespace, a test agent child in the second namespace; migrating the test agent to execute as a process in the first namespace; communicating, by the test agent child via the second physical network interface, test packets; obtaining, by the test agent, network performance measurement data that is based at least on the test packets; and outputting, by the test agent while executing as a process in the first namespace, an indication of the network performance measurement data.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements in the figures and text.

DETAILED DESCRIPTION

Figure 1:
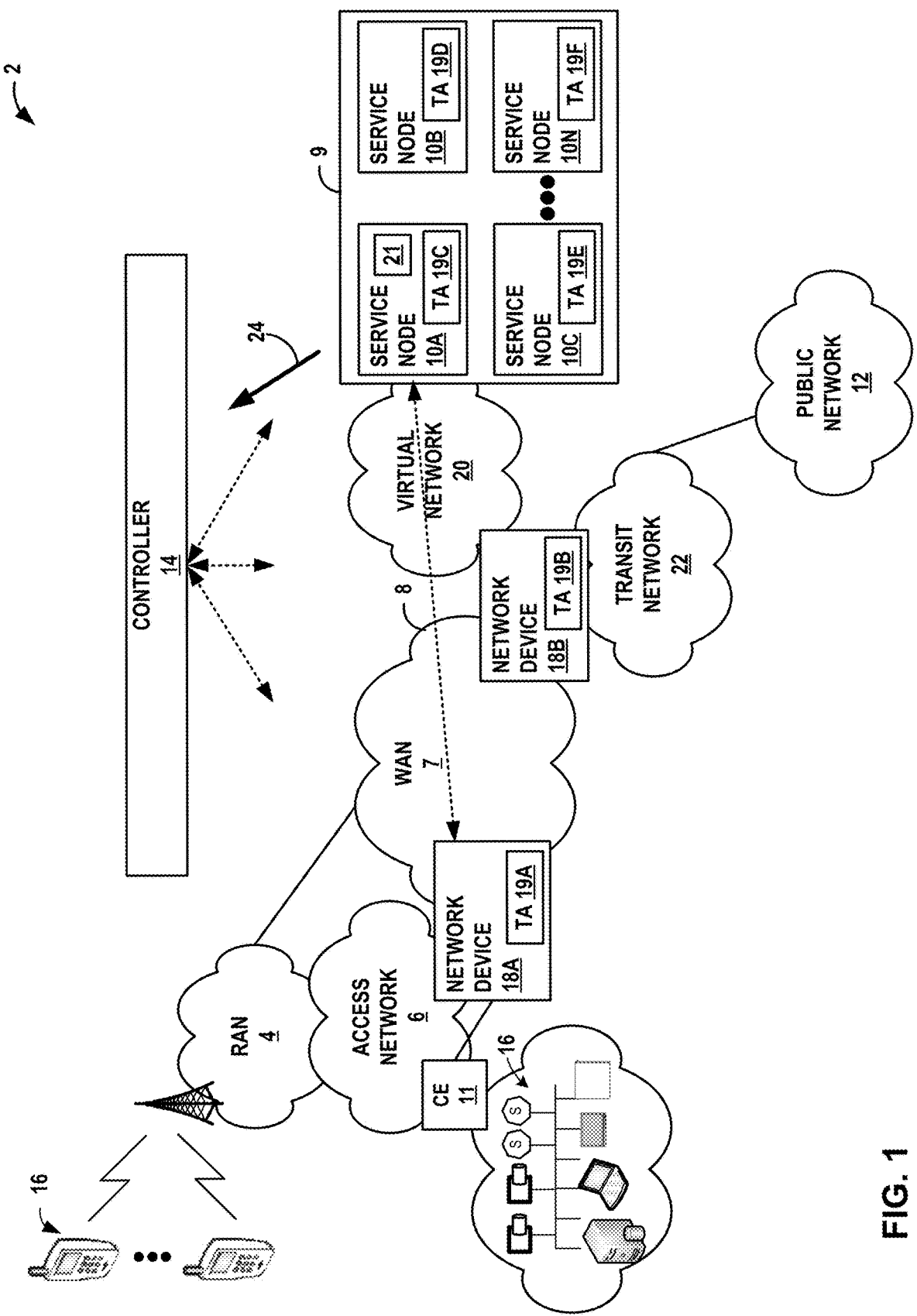
FIG. 1 is a block diagram illustrating an example network system having computing devices that execute namespace-aware test agents to perform network performance measurement, in accordance with one or more aspects of the techniques described in this disclosure.

FIG. 1 is a block diagram illustrating an example network system 2 ("network system 2") having computing devices that execute namespace-aware test agents to perform network performance measurement, in accordance with one or more aspects of the techniques described in this disclosure.

Network system 2 may operate as a private network to provide packet-based network services to subscriber devices 16. That is, network system 2 provides authentication and establishment of network access for subscriber devices 16 such that a subscriber device may begin exchanging data packets with public network 12, which may be an internal or external packet-based network such as the Internet.

In the example of FIG. 1, network system 2 comprises access network 6 that provides connectivity to public network 12 via wide area network 7 (hereinafter, "WAN 7"). WAN 7 and public network 12 may provide packet-based services that are available for request and use by subscriber devices 16. As examples, WAN 7 and/or public network 12 may provide bulk data delivery, voice over Internet protocol (VoIP), Internet Protocol television (IPTV), Short Messaging Service (SMS), Wireless Application Protocol (WAP) service, or customer-specific application services. Public network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various examples, public network 12 is connected to a public WAN, the Internet, or to other networks. Public network 12 executes one or more packet data protocols (PDPs), such as IP (IPv4 and/or IPv6), X.25 or Point-to-Point Protocol (PPP), to enable packet-based transport of public network 12 services.

In general, subscriber devices 16 connect to network devices 18A-18B (collectively, "network devices 18") via access network 6 to receive connectivity to subscriber services for applications hosted by public network 12. A subscriber may represent, for instance, an enterprise, a residential subscriber, or a mobile subscriber. Subscriber devices 16 may be, for example, personal computers, laptop computers or other types of computing devices positioned behind customer equipment (CE) 11, which may provide local routing and switching functions. Each of subscriber devices 16 may run a variety of software applications, such as word processing and other office support software, web browsing software, software to support voice calls, video games, video conferencing, and email, among others. For example, subscriber device 16 may be a variety of network-enabled devices, referred generally to as "Internet-of-Things" (IoT) devices, such as cameras, sensors (S), televisions, appliances, etc. In addition, subscriber devices 16 may comprise mobile devices that access the data services of network system 2 via a radio access network (RAN) 4. Example mobile subscriber devices include mobile telephones, laptop or desktop computers having, e.g., a wireless card, wireless-capable netbooks, tablets, video game devices, pagers, smart phones, personal data assistants (PDAs) or the like.

A network service provider operates, or in some cases leases, elements (e.g., network devices) of access network 6 to provide packet transport between subscriber devices 16 and network device 18A. Access network 6 represents a network that aggregates data traffic from one or more of subscriber devices 16 for transport to/from WAN 7 of the service provider. Access network 6 includes network nodes that execute communication protocols to transport control and user data to facilitate communication between subscriber devices 16 and network device 18A. Access network 6 may include a broadband access network, a wireless LAN, a public switched telephone network (PSTN), a customer premises equipment (CPE) network, or other type of access network, and may include or otherwise provide connectivity for cellular access networks, such as a radio access network (RAN), e.g., RAN 4. Examples of the RAN include networks conforming to a 5$^{th}$ Generation (5G) mobile network, 4$^{th}$ Generation (4G) mobile network Universal Mobile Telecommunications System (UMTS) architecture, an evolution of UMTS referred to as Long Term Evolution (LTE), 5G including enhanced mobile broadband, mobile IP standardized by the Internet Engineering Task Force (IETF), as well as other standards proposed by the 3$^{rd}$ Generation Partnership Project (3GPP), 3$^{rd}$ Generation Partnership Project 2 (3GGP/2) and the WiMAX forum.

Network device 18A-18B (collectively, "network devices 18") may each be a customer edge (CE) router, a provider edge (PE) router, SD-WAN edge device, service device, network appliance, a server executing virtualized network functions, or other computing device that provides connectivity between networks, e.g., access network 6 and public network 12, or network services. WAN 7 offers packet-based connectivity to subscriber devices 16 attached to access network 6 for accessing public network 12 (e.g., the Internet). WAN 7 may represent a public network that is owned and operated by a service provider to interconnect a plurality of networks, which may include access network 6. In some examples, WAN 7 may implement Multi-Protocol Label Switching (MPLS) forwarding and in such instances may be referred to as an MPLS network or MPLS backbone. In some instances, WAN 7 represents a plurality of interconnected autonomous systems, such as the Internet, that offers services from one or more service providers. Public network 12 may represent the Internet. Public network 12 may represent an edge network coupled to WAN 7 via a transit network 22 and one or more network devices, e.g., a customer edge device such as customer edge switch or router. Public network 12 may include a data center. In the example of FIG. 1, network device 18B may exchange packets with service nodes 10 via virtual network 20, and network device 18B may forward packets to public network 12 via transit network 22.

In examples of network system 2 that include a wireline/broadband access network, network devices 18A or 18B may represent a Broadband Network Gateway (BNG), Broadband Remote Access Server (BRAS), MPLS PE router, core router or gateway, or Cable Modem Termination System (CMTS). In examples of network system 2 that include a cellular access network as access network 6, network devices 18A or 18B may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to network device 18B may be implemented in a switch, service card or another network element or component. In some examples, network device 18B may itself be a service node.

A network service provider that administers at least parts of network system 2 typically offers services to subscribers associated with devices, e.g., subscriber devices 16, that access network system 2. Services offered may include, for example, traditional Internet access, VoIP, video and multimedia services, and security services. As described above with respect to WAN 7, WAN 7 may support multiple types of access network infrastructures that connect to service provider network access gateways to provide access to the offered services, e.g., service provided by service node 10. In some instances, the network system may include subscriber devices 16 that attach to multiple different access networks 6 having varying architectures.

In general, any one or more of subscriber devices 16 may request authorization and data services by sending a session request to a gateway device such as network devices 18A or 18B. In turn, the network device may access a central server (not shown) such as an Authentication, Authorization and Accounting (AAA) server to authenticate the one of subscriber devices 16 requesting network access. Once authenticated, any of subscriber devices 16 may send subscriber data traffic toward WAN 7 to access and receive services provided by public network 12, and such packets may traverse network devices 18A or 18B as part of at least one packet flow. In some examples, network device 18A may forward all authenticated subscriber traffic to public network 12, and network device 18B may apply services and/or steer particular subscriber traffic to data center 9 if the subscriber traffic requires services on service nodes 10. Applications (e.g., service applications) to be applied to the subscriber traffic may be hosted on service nodes 10.

For example, network system 2 includes a data center 9 having a cluster of service nodes 10 that provide an execution environment for the virtualized network services. In some examples, each of service nodes 10 represents a service instance. Each of service nodes 10 may apply one or more services to traffic flows. As such, network device 18B may steer subscriber packet flows through defined sets of services provided by service nodes 10. That is, in some examples, each subscriber packet flow may be forwarded through a particular ordered combination of services provided by services nodes 10, each ordered set being referred to herein as a "service chain." As examples, service nodes 10 may apply stateful firewall (SFW) and security services, deep packet inspection (DPI), carrier grade network address translation (CGNAT), traffic destination function (TDF) services, media (voice/video) optimization, Internet Protocol security (IPSec)/virtual private network (VPN) services, hypertext transfer protocol (HTTP) filtering, counting, accounting, charging, and/or load balancing of packet flows, or other types of services applied to network traffic.

In some examples, network system 2 comprises a software defined network (SDN) and network functions virtualization (NFV) architecture. In these examples, an SDN controller (not shown) may provide a controller for configuring and managing the routing and switching infrastructure of network system 2.

Although illustrated as part of data center 9, service nodes 10 may be network devices coupled by one or more switches or virtual switches of WAN 7. In one example, each of services nodes 10 may run as virtual machines (VMs) in a virtual compute environment. Moreover, the compute environment may comprise a scalable cluster of general computing devices, such as x86 processor-based services. As another example, service nodes 10 may comprise a combination of general-purpose computing devices and special-purpose appliances. As virtualized network services, individual network services provided by service nodes 10 can scale just as in a modern data center through the allocation of virtualized memory, processor utilization, storage and network policies, as well as horizontally by adding additional load balanced VMs. In other examples, services nodes 10 may be gateway devices or other routers. In further examples, the functionality described with respect to each of service nodes 10 may be implemented in a switch, service card, or another network element or component.

As described herein, computing devices within network system 2 may provide network monitoring services. For example, network devices 18 and/or service nodes 10 are configured as measurement points (e.g., with test agents) to provide network monitoring services to determine, for example, network performance and functionality, as well as interconnections of service chains. Test agents may be delivered from a cloud as a Software-as-a-Service (SaaS) solution, deployed on premises in NFV environments, installed to host computing devices, etc. Computing devices configured with test agents may send and/or receive test packets to compute one or more key performance indicators (KPIs) of the network, such as latency, delay (inter frame gap), jitter, packet loss, throughput, and the like. Test agents and test agent children may send test packets in accordance with various protocols, such as Hypertext Transfer Protocol (HTTP), Internet Control Message Protocol (ICMP), Speedtest, User Datagram Protocol (UDP), Transmission Control Protocol (TCP), Operations, Administration and Maintenance (OAM) functions (e.g., Y.1731), Two-Way Active Measurement Protocol (TWAMP), Internet Protocol television (IPTV) and Over the Top (OTT) protocol, VoIP telephony and Session Initiation Protocol (SIP), mobile radio, remote packet inspection, and other protocols to measure network performance.

In the example of FIG. 1, network device 18A is configured with test agent 19A, network device 18B is configured with test agent 19B, service node 10A is configured with test agent 19C, service node 10B is configured with test agent 19D, service node 10C is configured with test agent 19E, and service node 10D is configured with test agent 19F. Although each of network devices 18 and service nodes 10 are described as being configured with a test agent, any number of network devices and/or service nodes may be configured with test agents to provide monitoring services. Test agents 19A-19E are referred to collectively as "test agents 19."

In accordance with the techniques described in this disclosure, test agents 19 are namespace-aware. For example, each of test agent 19A deployed to network device 18A and test agent 19C deployed to service node 10A, is a process that is capable of moving between namespaces of its device and creating a child process (hereinafter, "test agent child" or "test agent child process") within each namespace to perform network measurement performance for that namespace and its associated resources. As described with respect to test agent 19C, for instance, service node 10A may be configured with multiple namespaces. Test agent 19C may move from a first namespace of service node 10A to second namespace and there create a test agent child process 21. Test agent 19C may then move back to the first namespace.

To test the network performance between network device 18A and service node 10A, for example, test agent 19A of network device 18A may send a test packet to service node 10A. The test packet may include a timestamp that indicates the time at which the test packet is sent. The timestamp sent by test agent 19A may be referred to herein as "sending timestamp." Test agent child process 21 of service node 10A may receive the test packet including the sending timestamp and generate a timestamp that indicates the time at which the test packet is received. The timestamp generated by test agent child process 21 of service node 10A may be referred to herein as "receiving timestamp." Test agent child process 21 of service node 10A may use the sending timestamp and the receiving timestamp to compute one or more KPIs. For example, test agent child process 21 of service node 10A may determine the latency between network device 18A and service node 10A based on the difference between the receiving timestamp and the sending timestamp. Test agent 19C obtains the KPI measurements from test agent child process 21 of service node 10A, and test agent 19C sends the one or more KPI measurements (illustrated in FIG. 1 as KPI measurements 24) to controller 14, which may present, e.g., via a graphical user interface, the one or more KPI measurements to a user and/or network administrator. In some examples, test agent 19C obtains and send the timestamps or other network performance measurement data, in addition to or instead of KPI measurements. In this way, devices configured with namespace-aware test agents may measure the network performance between the sender device and the receiver device with one or more test packets.

Test agent child process 21 operating in the second namespace may exchange test packets with network device 18A via a network interface allocated to that namespace and accessible to processes within that namespace, and the test agent child process 21 may collect network performance measurement data based on the test packets. Because the test packets are sent and received via the network interface allocated to that namespace, the network performance measurement data based on the test packets is specific to that namespace. Test agent child process 21 may have more limited functionality than test agents 19. For instance, test agents 19 may be capable of moving between namespaces and creating test agent children, may perform network measurement performance by sending and receiving test packets via a network interface, may listen for and respond to network state changes in different namespaces, may collect network performance measurement data from the test agent children in other namespaces, and may have a northbound interface for communicating network performance measurement data to controller 14. Test agent child process 21 may be more lightweight and may not have either patent or latent functionality for one or more of the above capabilities. For example, the binary program for test agent child process 21 may not include code for migrating to a different namespace. Code may refer to machine-executable or interpretable instructions.

Although described for purposes of example with respect to a service provider network context in FIG. 1, the techniques of the disclosure can be applied in any network assurance context.

Figure 2:
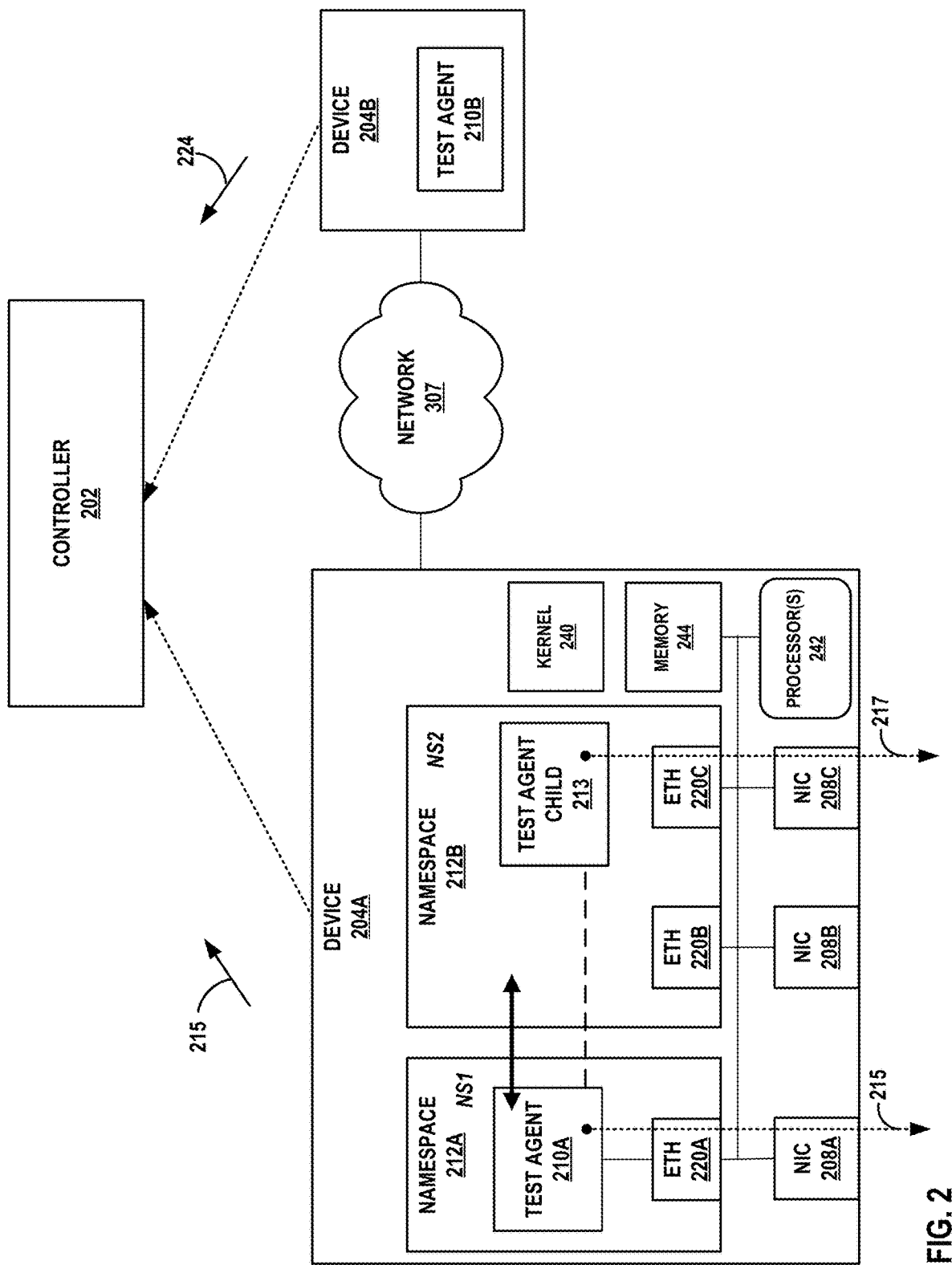
FIG. 2 is a block diagram illustrating an example of a network system having computing devices that execute namespace-aware test agents to perform network performance measurement, in accordance with one or more aspects of the techniques described in this disclosure.

FIG. 2 is a block diagram illustrating an example of a network system having computing devices that execute namespace-aware test agents to perform network performance measurement, in accordance with one or more aspects of the techniques described in this disclosure.

In the example of FIG. 2, controller 202 may represent an example of controller 14 of FIG. 1, and devices 204A-204B may represent any of network devices 18, service nodes 10 of FIG. 1, or any computing device configured as measurement points to measure network performance. Network 207 may represent WAN 7 of FIG. 1, and/or other networks connecting at least two computing devices having test agents and configured as measurement points.

Computing device 204A is shown in further detail and includes hardware resources to provide an operating environment for test agent 210A and test agent child 213. Device 204A may be a real or virtual server. Computing device 204A includes, in this example, a bus coupling hardware components that include network interface cards (NICs) 208A-208C, one or more processors 242, and memory 244. Computing device 204A may include or otherwise have access to a storage disk or volume (not shown). Various hardware configurations are contemplated. Any of NICs 208A-208C may be SR-IOV-capable. A front-side bus may in some cases couple processor(s) 242 and memory 244. In some examples, a bus may couple memory 244, processor(s) 242, and NICs 208A-208C. The bus may represent a Peripheral Component Interface (PCI) express (PCIe) bus. In some examples, a direct memory access (DMA) controller may control DMA transfers among components coupled to the bus. In some examples, components coupled to the bus control DMA transfers among components coupled to the bus.

Processor(s) 242 may include one or more processors each including an independent execution unit having processing circuitry to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

A storage disk or volume represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by processor(s) 242.

Main memory 244 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 244 provides a physical address space composed of addressable memory locations.

Each of NICs 208A-208C includes one or more interfaces configured to exchange packets using links of a physical network. NICs 208A-208C may include a port interface card having one or more network ports. NICs 208A-208C may also include an on-card memory to, e.g., store packet data, timestamps, counters of sent and/or dropped packets. Direct memory access transfers between the NICs 208A-208C and other devices coupled to the bus may read/write from/to NIC memory. Ethernet devices (ETH) 220A-220C may kernel 240 devices by which user space process can read data from and write data to NICs 208A-208C, respectively.

Memory 244, NICs 208A-208C, the storage disk, and processor(s) 242 may provide an operating environment for a software stack that includes an operating system kernel 240 executing in kernel space. Kernel 240 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines or may execute a container engine and one or more pods. Additional examples of monitoring services provided by virtual execution elements is described in U.S. Provisional Patent Application 63/114,444, entitled "Active Assurance for Virtualized Services," filed Nov. 16, 2020, the entire contents of which is incorporated by reference herein.

Kernel 240 can partition kernel 240 and hardware resources such as NICs 208A-208C among processes, such that one set of processes has access to some of the resources, while another set of processes has access to other resources. Each such partition of resources and the processes having access to that partition is one of namespaces 212A-212B. Processes can create additional namespaces and move between namespaces. In this example, NIC 208A is allocated to namespace 212A and NICs 208B-208C are allocated to namespace 212B. Namespaces 212A-212B may be Linux network namespaces, for instance. Each namespace may behave like a separate Linux host. With separate network namespaces, two interfaces can have the same IP address without collisions.

In some examples, test agent 210A monitors a network namespace directory of kernel 240 for updates to the namespaces of device 204A. Where kernel 240 is a Linux kernel, the network namespace directory may include "/var/run/netns". Test agent 210A may poll the network namespace directory for new files indicative of updates to the namespaces of computing device 204A, e.g., a new "N52" file indicative of a new namespace 212B. Test agent 210A may alternatively become a listener for events for the network namespace directory indicative of updates to the namespaces of computing device 204A. For instance, test agent 21A may use inotify to create a listener for such events, such as new files in "/var/run/netns". Test agent 210A, when launched (e.g., via an interface of computing device 204A—not shown), may read the network namespace directory to obtain namespace description data for existing namespaces of computing device 204A.

In response to obtaining an indication that namespace 212B ("N52") has been created, test agent 210A may obtain and send, to controller 202, namespace description data for namespace 212B. Namespace description data can include a namespace identifier or name (e.g., "N52"), a list of resources assigned to the namespace (e.g., NICs 208B-208C, ETHs 220B-220C), or other data that characterizes or describes namespace 212B. Test agent 210A may be granted permissions by a user or kernel 240 to obtain namespace description data for namespaces 212, and to migrate among namespaces 212.

Controller 202 may display, to a user via a client interface, namespace description data for each namespace of computing device 204A. The user may interface with the client interface to set up network performance measurement for any of the namespaces. Controller 202 may process the user inputs to generate configuration data for configuring network performance measurement with respect to any of namespaces 212A-212B.

Test agent 210A operates in namespace 212A when communicating with controller 202. In this way, controller 202 may receive network performance measurement data, send configuration data for network performance measurement, and otherwise interact with a process of computing device 204A using a single network interface, NIC 208A in this example. If test agent 210A were to attempt to communicate with controller 202 when operating in namespace 212B, it would be barred from accessing NIC 208A assigned to namespace 212A. Any attempt by test agent 210A to communicate using NIC 208C or NIC 208B would be using an interface not expected by controller 202, which may result in failed communications.

Test agent 210A may subsequently receive, from controller 202, configuration data for namespace 212B and, more specifically in some cases, for configuring network performance measurements between device 204A and device 204B. The configuration data may be provided in association with the identifier for namespace 212B to indicate the configuration data is for configuring network performance measurement with respect to namespace 212B. Configuration data may more specifically identify (using, e.g., IP addresses) an interface of NIC 208C and a corresponding interface of a NIC of device 204B (not shown).

Test agent 210A is a process executing in namespace 212A and has access to hardware resources allocated to namespace 212A. Because test agent 210A is operating in namespace 212A, test agent 210A migrates to namespace 212B in response to the indication that namespace 212B has been created. To migrate, test agent 210A may invoke a system call of kernel 240 to request migration to namespace 212B. An example system call is setns( ), which allows the calling thread to move into a different namespace.

Once operating in namespace 212B, test agent 210A creates test agent child 213 as a child process. To create test agent child 213, test agent 210A may invoke a system call of kernel 240 to fork its process thread to create a child process from a test agent child 213. An example system call of kernel 240 is fork( ). Test agent child 213 may represent an example of test agent child process 21 of FIG. 1. In addition to creating test agent child 213, test agent 210A may cause test agent child 213 to be configured with the configuration data for configuring network performance measurement with respect to namespace 212B. That is, the configuration data may configure test agent child 213 to perform network performance measurement. The configuration data may cause test agent child 213 to, for instance, perform network performance measurement between itself and test agent 210B via NIC 208C.

To test the network performance between test agent child 213 and test agent 210B, for example, test agent child 213 may send a test packet 217 to test agent 210B via NIC 208C. The test packet may include a timestamp that indicates the time at which the test packet is sent. The timestamp sent by test agent child 213 may be referred to herein as "sending timestamp." Test agent 210B may receive the test packet including the sending timestamp and generate a timestamp that indicates the time at which the test packet is received. The timestamp generated by test agent 210B may be referred to herein as "receiving timestamp." Test agent 210B may use the sending timestamp and the receiving timestamp to compute one or more KPIs. For example, test agent 210B may determine the latency between NIC 208C and a NIC of device 204B based on the difference between the receiving timestamp and the sending timestamp. Test agent 210B sends the one or more KPI measurements as network performance measurement data to controller 202, which may present, e.g., via a graphical user interface, the one or more KPI measurements to a user and/or network administrator. As used herein, "communicating" a test packet may refer to sending a test packet to another process/device or receiving a test packet from another process/device.

In the other direction, test agent 210B may send a test packet to test agent child 213, which may perform a similar process to compute network performance measurement data, such as latency, between a NIC of device 204B and NIC 208C. However, test agent child 213 does not communicate with controller 202. Test agent 210A obtains the network performance measurement data from test agent child 213 and may send the network performance measurement data to controller 202 in message 215. In this way, devices configured with namespace-aware test agents may measure the network performance between the sender device and the receiver device with one or more test packets.

Test agent 210A may obtain the network performance measurement data from test agent child 213 in a variety of ways, such as inter-process communication or a shared file or memory. Test agent 210A may periodically migrate to namespace 212B to request updated network performance measurement data from test agent child 213.

As a result of test agent 210A and test agent child 213 typically operating in different namespaces, management traffic such as message 215 and network performance measurement traffic such as test packet 217 are isolated in that the traffic is sent and received via different NICs 208A and 208C and by different processes: test agent 210A and test agent child 213, respectively. Reducing management traffic on NIC 208C reduces link utilization for the link connected to NIC 208C, which may also be used for data or service traffic between device 204A and device 204B via network 307.

In some examples, test agent 210A causes network performance measurement between NIC 208A and NIC 208C. Test agent 210A and test agent child 213 may be configured to send, receive, and/or exchange test packets with one another to measure unidirectional or bidirectional network performance on the network between NIC 208A and NIC 208C. Each of NICs 208A and 208C may be connected by a different link to a switch fabric, for instance, to different leaf nodes of the switch fabric, to the same leaf node of the switch fabric, to the same or a different switch, or according to some other network topology. Thus, test agent 210A may send test packets to test agent child 213, vice-versa, or combination thereof.

In some examples, test agent 210A monitors for network namespace events in namespace 212B. After migrating to namespace 212B, test agent 210A may create a monitoring interface to listen for such network namespace events. For instance, test agent 210A may create a netlink socket, which in general is used to transfer information between kernel 240 and a user space process such as test agent 210A. The netlink socket allows test agent 210A to listen for network interface create/delete/up/down events or other state changes, IP address add/delete/change events, or other changes to the state of NIC 208B or NIC 208C. Kernel 240 sends these events via the netlink socket to the listener, and test agent 210A makes itself the listener. In this way, test agent 210A can monitor state changes in the namespace 212B or networking subsystem.

In response to receiving an event via the netlink socket, test agent 210A migrates to namespace 212B and reads the state of the networking subsystem, which may provide an indication of the change to the state of NIC 208C such as a modified IP address or a link status change. Test agent 210A may output the indication of the change of the state of NIC 208C to controller 202, which may provide update configuration data for network performance measurement via NIC 208C via test agent child 213.

In some examples, controller 202 receives, from test agent 210A and test agent 210B, network performance measurement data in the form of timestamps for messages sent and receive between test agent child 213 and test agent 210B. Controller 202 may use the network performance measurement data to compute one or more KPIs for network performance. In some examples, test agents 210A-210B compute and sent the KPIs to controller 202.

Figure 3:
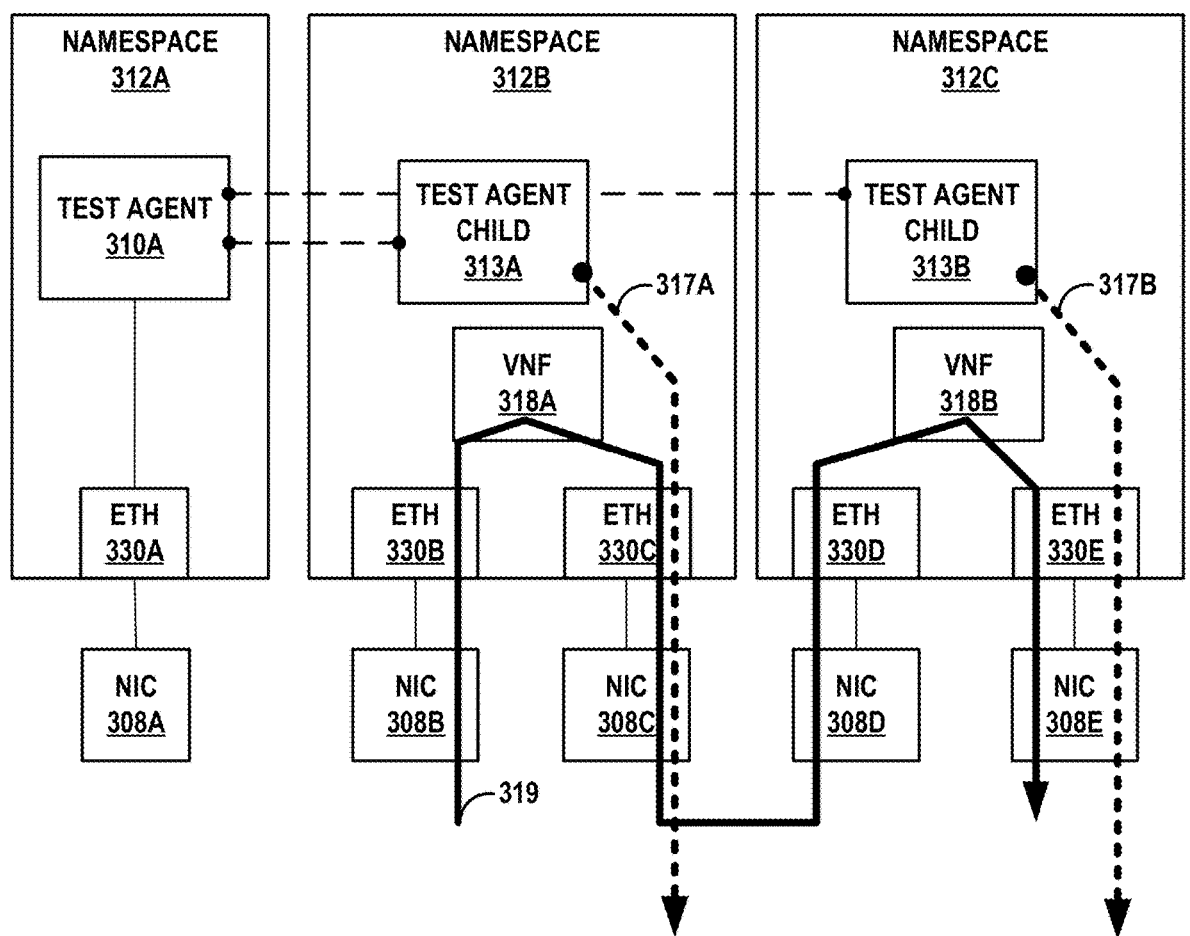
FIG. 3 is a block diagram illustrating an example of a computing device that executes a namespace-aware test agent to perform network performance measurement, in accordance with one or more aspects of the techniques described in this disclosure.

FIG. 3 is a block diagram illustrating an example of a computing device that executes a namespace-aware test agent to perform network performance measurement, in accordance with one or more aspects of the techniques described in this disclosure. Device 300 may be similar to computing device 204A. Device 300 executes multiple virtual network functions (VNFs) 318A-318B arranged as a service chain of network functions. The service chain processes network traffic 319 by applying, in order, VNF 318A and then VNF 318B to the network traffic 319.

In this example, each VNF 318A-318B operates in a different one of namespaces 312B-312C. In order to measure network performance at different location in the service chain, such as at the egress interface of VNF 318A/ingress interface of VNF 318B and also at the egress interface of VNF 318B, test agent 310A may cause create test agent child 313A in namespace 312B and test agent child 313B in namespace 312C. Test agent child 313A may send test packets 317A to test agent child 313B via NIC 308C, and test agent child 313B may send test packets 317B via NIC 308E. Test agent 310A obtains network performance measurement data from test agent child 313A and/or 313B in the form of test packets, timestamps, or one or more KPIs, and may send such indications of the network performance between VNFs 318A and 318B to controller 202.

In some instances, the kernel of device 300 may execute a hypervisor or container engine and one or more virtual execution elements, e.g., virtual machines or pods managed by the hypervisor or container engine, respectively. These virtual execution elements may host VNFs 318. These virtual execution elements may host any of test agent 310A and test agent children 313A-313B.

Figure 4:
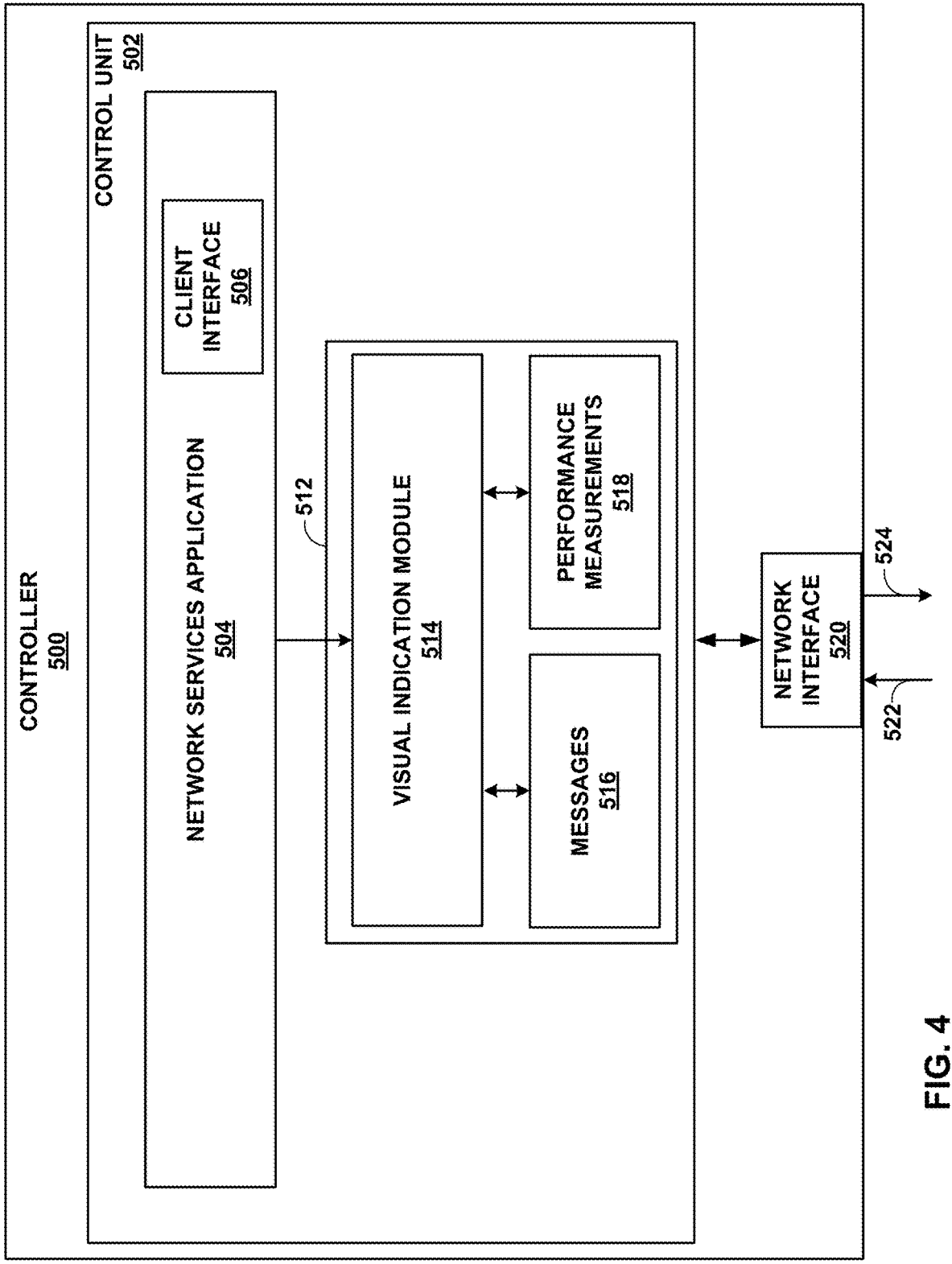
FIG. 4 is a block diagram illustrating an example of a controller capable of operating in accordance with the techniques described in this disclosure.

FIG. 4 is a block diagram illustrating an example of a controller capable of operating in accordance with the techniques described in this disclosure. Controller 500 may include a server or network controller, for example, and may represent an example instance of controller 14 of FIG. 1 or controller 202 of FIG. 2. In some examples, controller 500 is a control center that manages test agents 310, and receives configuration and instructions via APIs from an orchestrator, such as a Kubernetes orchestrator.

In the example of FIG. 4, controller 500 includes a control unit 502 coupled to a network interface 520 to exchange packets with other network devices by inbound link 522 and outbound link 524. Control unit 502 may include one or more processors (not shown in FIG. 4) that execute software instructions, such as those used to define a software or computer program, stored to a computer-readable mediums including a storage device (e.g., a disk drive, or an optical drive) or a memory (such as Flash memory or random access memory (RAM)) or any other type of volatile or non-volatile memory, that stores instructions to cause the one or more processors to perform the techniques described herein. Alternatively, or additionally, control unit 502 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 502 provides an operating environment for network services applications 504 and network measurement module 512. In one example, these modules may be implemented as one or more processes executing on one or more virtual machines of one or more servers. That is, while generally illustrated and described as executing on a single controller 500, aspects of these modules may be delegated to other computing devices.

Network services applications 504 represent one or more processes that provide services to clients of the network that includes controller 500 to provide a visualization of network performance measurements computed from test packets exchanged by test agents within the network. Network services applications 504 provide services such as performance measurement visualization, session management to test agents, etc. Each of network services applications 504 may include client interface 506 by which one or more client applications request services. Client interface 506 may represent a command line interface (CLI) or graphical user interface (GUI), for instance. Client interface 506 may also, or alternatively, provide an application programming interface (API) such as a web service to client applications.

Client interface 506 is a user or machine interface and may display, to a user, namespace description data for one or more computing devices. For a given computing device, a user or administrator may use client interface 506 to select a namespace and configure network performance measurement for the namespace. Network services applications 504 processes user inputs received at client interface 506, generates configuration data for configuring the network performance measurement, and outputs the configuration data to the computing device via network interface 520.

Client interface 506 may provide an interface to a computing device, such as computing device 204A. Alternatively, a user may directly interface with the computing device. The interface may allow the user to start a test agent with a command. The command may have available flags or other options for filtering detected namespaces, such as a flag to discover all namespaces and their interfaces, exclude specified namespaces, or include only specified namespaces. Client interface 506 may display interfaces in association with an identifier for their respective namespaces. A user may use client interface 506 to select an interface and configure network performance measurement for the selected interface. In some examples, namespace awareness as described herein is an optional feature that a user may enable using a flag. In some examples, namespace awareness is enabled by default, but can be disabled.

Network services applications 504 may issue requests to visualize network performance measurements to network measurement module 512. Network measurement module 512 may generate visual indications, such as indications of performance measurements computed by a receiver test agent (e.g., test agent 210B of FIG. 1 or test agent child 313B of FIG. 3). For example, controller 500 may establish a session (e.g., NETCONF) with the test agent 210A or test agent 310A and receive one or more performance measurements from the test agent in messages 516 via inbound link 522. In some cases, messages 516 include the KPIs computed by the test agent. Controller 500 may store the one or more performance measurements in a performance measurements data store 518. Network measurement module 512 may output for display a visual indication of the one or more performance measurements stored in performance measurements data store 518.

Figure 5:
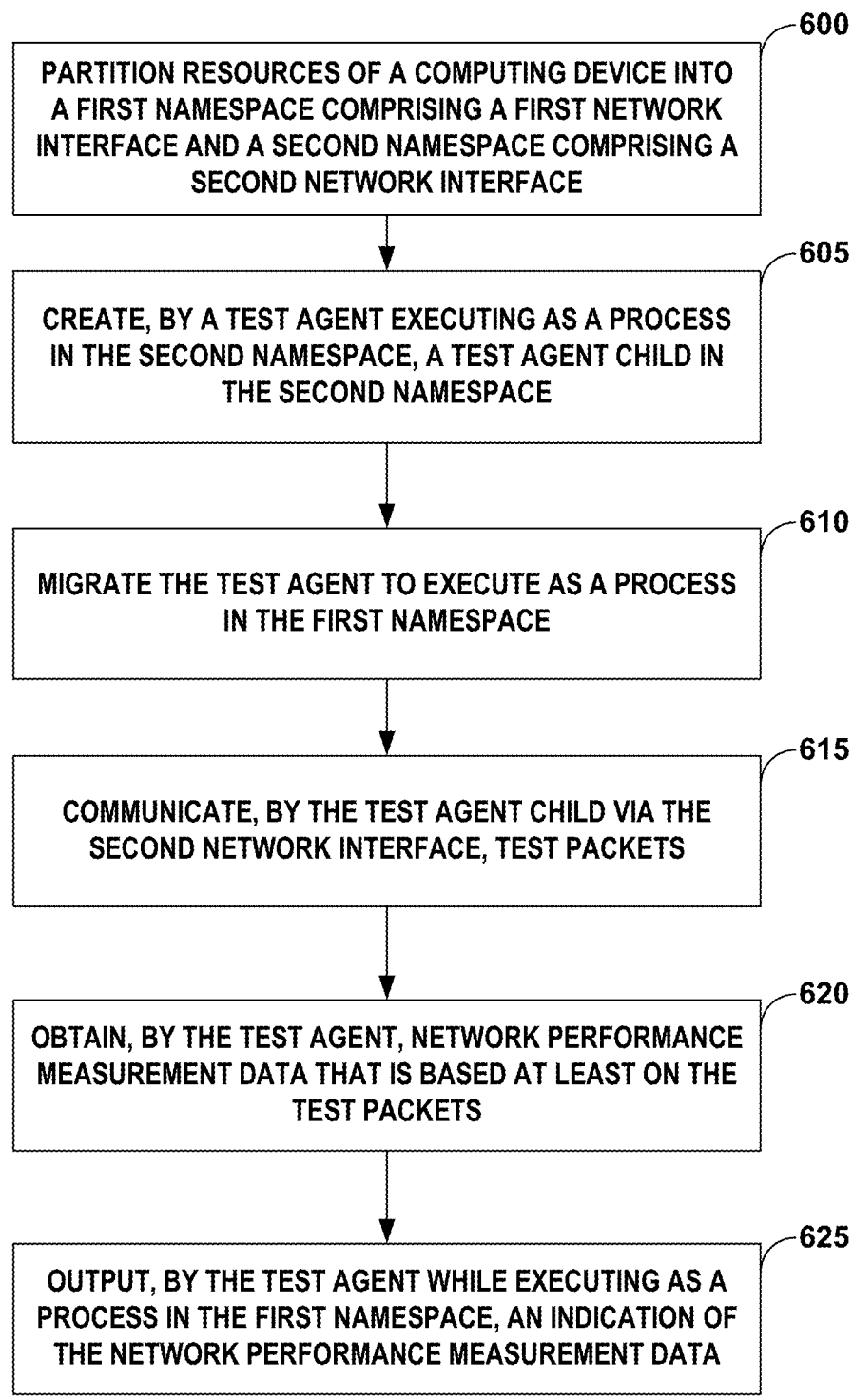
FIG. 5 is a flow diagram illustrating an example operation of a computing device, in accordance with one or more techniques of this disclosure.

FIG. 5 is a flow diagram illustrating an example operation of a computing device, in accordance with one or more techniques of this disclosure. The computing device may be an instance of any of the computing devices or network elements in this disclosure. As seen in the example of FIG. 5, the computing device may partition resources of the computing device into a first namespace comprising a first physical network interface and a second namespace comprising a second physical network interface (600). A test agent executing as a process in the second namespace may create a test agent child in the second namespace (605). The test agent may migrate to execute as a process in the first namespace (610). The test agent child may communicate, via the second physical network interface, test packets (615). The test agent may obtain network performance measurement data that is based at least on the test packets (620). The test agent, while executing as a process in the first namespace, may output an indication of the network performance measurement data (625).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A computing device comprising:
a first physical network interface and a second physical network interface; and
one or more processors operably coupled to a memory, wherein the one or more processors and memory are configured to:
partition resources of the computing device into a first namespace comprising the first physical network interface and a second namespace comprising the second physical network interface;
create, by a test agent executing as a process in the second namespace, a test agent child in the second namespace;
migrate the test agent to execute as a process in the first namespace;
communicate, by the test agent child via the second physical network interface, test packets;
obtain, by the test agent, network performance measurement data that is based at least on the test packets; and
output, by the test agent while executing as a process in the first namespace, an indication of the network performance measurement data.

2. The computing device of claim 1, wherein the first namespace comprises a first Linux network namespace and the second namespace comprises a second Linux network namespace.

3. The computing device of claim 1, wherein the one or more processors and memory are configured to:
create, by the test agent executing as a process in the second namespace, a netlink socket;
receive, by the test agent, after migration of the test agent to execute as a process in the first namespace, an event indicating a change to a state of the second physical network interface; and
output, by the test agent while executing as a process in the first namespace, to a controller, an indication of the change to the state of the second physical network interface.

4. The computing device of claim 3, wherein the one or more processors and memory are configured to:
migrate, in response to the event, the test agent to execute as a process in the second namespace; and
read the state of the second physical network interface to obtain the indication of the change to the state of the second physical network interface.

5. The computing device of claim 1, wherein the one or more processors and memory are configured to:
monitor, by the test agent executing as a process in the first namespace, a network namespace directory of a kernel of the computing device to obtain an indication of creation of the second namespace; and
migrate, in response to the indication of creation of the second namespace, the test agent to execute as a process in the second namespace and create the test agent child in the second namespace.

6. The computing device of claim 1, wherein the one or more processors and memory are configured to:
monitor, by the test agent executing as a process in the first namespace, a network namespace directory of a kernel of the computing device to obtain an indication of creation of the second namespace;
output, by the test agent in response to the indication of creation of the second namespace, an identifier for the second namespace to a controller;
receive, by the test agent, from the controller, configuration data for the second namespace in association with the identifier for the second namespace; and
migrate, in response to the receipt of the configuration data, the test agent to execute as a process in the second namespace and create the test agent child in the second namespace and configure the test agent child with the configuration data.

7. The computing device of claim 1, wherein the one or more processors and memory are configured to:
communicate, by the test agent via the first physical network interface, to a controller, management traffic for managing network performance measurement.

8. The computing device of claim 1, wherein the one or more processors and memory are configured to:
communicate, by the test agent child via the second physical network interface, the test packets with the test agent to measure network performance between the second physical network interface and the first physical network interface.

9. The computing device of claim 1, further comprising:
a third physical network interface,
wherein the test agent child is a first test agent child,
wherein the one or more processors and memory are configured to:
further partition resources of the computing device into a third namespace comprising the third physical network interface;
create, by the test agent executing as a process in the third namespace, a second test agent child in the third namespace; and
communicate, by the first test agent child via the second physical network interface, the test packets with the second test agent child to measure network performance between the second physical network interface and the third physical network interface.

10. The computing device of claim 1, wherein the test agent child does not include code for migrating the test agent child to a different namespace.

11. The computing device of claim 1, wherein the test agent configures the test agent child with configuration data for generating one or more of the test packets for output to measure network performance.

12. A method comprising:
partitioning resources of a computing device into a first namespace comprising a first physical network interface and a second namespace comprising a second physical network interface;
creating, by a test agent executing as a process in the second namespace, a test agent child in the second namespace;
migrating the test agent to execute as a process in the first namespace;
communicating, by the test agent child via the second physical network interface, test packets;
obtaining, by the test agent, network performance measurement data that is based at least on the test packets; and
outputting, by the test agent while executing as a process in the first namespace, an indication of the network performance measurement data.

13. The method of claim 12, wherein the first namespace comprises a first Linux network namespace and the second namespace comprises a second Linux network namespace.

14. The method of claim 12, further comprising:
creating, by the test agent executing as a process in the second namespace, a netlink socket;
receiving, by the test agent, after migration of the test agent to execute as a process in the first namespace, an event indicating a change to a state of the second physical network interface; and
outputting, by the test agent while executing as a process in the first namespace, to a controller, an indication of the change to the state of the second physical network interface.

15. The method of claim 12, further comprising:
monitoring, by the test agent executing as a process in the first namespace, a network namespace directory of a kernel of the computing device to obtain an indication of creation of the second namespace; and
migrating, by the test agent in response to the indication of creation of the second namespace, to execute as a process in the second namespace and create the test agent child in the second namespace.

16. The method of claim 12, further comprising:
monitoring, by the test agent executing as a process in the first namespace, a network namespace directory of a kernel of the computing device to obtain an indication of creation of the second namespace;
outputting, by the test agent in response to the indication of creation of the second namespace, an identifier for the second namespace to a controller;
receiving, by the test agent, from the controller, configuration data for the second namespace in association with the identifier for the second namespace; and
migrating, in response to the receipt of the configuration data, the test agent to execute as a process in the second namespace and create the test agent child in the second namespace and configure the test agent child with the configuration data.

17. The method of claim 12, further comprising:
communicating, by the test agent child via the second physical network interface, to a controller, the test packets with the test agent to measure network performance between the second physical network interface and the first physical network interface.

18. The method of claim 12, wherein the test agent child does not include code for migrating the test agent child to a different namespace.

19. The method of claim 12, further comprising:
configuring, by the test agent, the test agent child with configuration data for generating one or more of the test packets for output to measure network performance.

20. A non-transitory computer-readable medium comprising instructions for causing processing circuitry to perform operations comprising:
partitioning resources of a computing device into a first namespace comprising a first physical network interface and a second namespace comprising a second physical network interface;
creating, by a test agent executing as a process in the second namespace, a test agent child in the second namespace;
migrating the test agent to execute as a process in the first namespace;
communicating, by the test agent child via the second physical network interface, test packets;
obtaining, by the test agent, network performance measurement data that is based at least on the test packets; and
outputting, by the test agent while executing as a process in the first namespace, an indication of the network performance measurement data.

* * * * *